United States Patent [19]

Lindgaard et al.

[11] Patent Number: 5,888,645
[45] Date of Patent: Mar. 30, 1999

[54] METHOD AND APPARATUS FOR MANUFACTURING AN ARTICLE OF A COMPOSITE MATERIAL

[75] Inventors: Torben Lindgaard, Borre; David Morgan Thomas, Stenstrup, both of Denmark

[73] Assignee: Obtec A/S, Svendborg, Denmark

[21] Appl. No.: 988,923

[22] PCT Filed: Sep. 13, 1991

[86] PCT No.: PCT/DK91/00269

§ 371 Date: May 10, 1993

§ 102(e) Date: May 10, 1993

[87] PCT Pub. No.: WO92/05023

PCT Pub. Date: Apr. 2, 1992

[30] Foreign Application Priority Data

Sep. 14, 1990 [DK] Denmark ................... 2209/90

[51] Int. Cl.$^6$ ............... B32B 5/02; B32B 27/16; B29C 35/08; B29C 43/00

[52] U.S. Cl. ............ 428/324; 428/323; 428/325; 428/327; 428/328; 428/329; 428/330; 428/331; 428/364; 428/367; 428/413; 428/423.1; 428/473.5; 428/474.4; 428/447; 428/425.9; 428/482; 428/524; 264/442; 264/443; 264/69; 425/174.2

[58] Field of Search ............ 425/174.2; 264/23, 264/25, 26, 68, 442, 493, 69; 156/73.1; 428/458, 402, 407, 460, 323, 324, 325, 327, 328, 329, 330, 331, 364, 367, 413, 423.1, 425.9, 473.5

[56] References Cited

U.S. PATENT DOCUMENTS 4,197,352 4/1980 Emmett et al. ............ 428/409
4,487,728 12/1984 Hagen et al. ............ 264/23
4,548,771 10/1985 Senapati et al. ............ 264/23
4,793,954 12/1988 Lee et al. ............ 264/23
4,866,107 9/1989 Doxsee et al. ............ 523/153
4,957,668 9/1990 Plackard et al. ............ 264/23
5,032,327 7/1991 Becheret ............ 264/26

FOREIGN PATENT DOCUMENTS

| 8628982 | 2/1983 | Australia . |
|---|---|---|
| 0 093 655 | 9/1983 | European Pat. Off. . |
| 0 347 299 | 12/1989 | European Pat. Off. . |
| 0 352 363 | 1/1990 | European Pat. Off. . |
| 1 584 352 | 12/1969 | France . |
| 2 158 003 | 6/1973 | France . |
| 29 06 842 | 7/1980 | Germany . |
| 61-181630 | 8/1986 | Japan . |
| 2 012 204 | 7/1979 | United Kingdom . |
| 2 106 823 | 4/1983 | United Kingdom . |
| 2 135 412 | 8/1984 | United Kingdom . |
| 2246095 | 1/1992 | United Kingdom . |

Primary Examiner—Vivian Chen
Attorney, Agent, or Firm—Finnegan, Henderson, Farabow, Garrett & Dunner, L.L.P.

[57] ABSTRACT

A fiber-reinforced composite material and articles of manufacture formed thereof are formed by the method comprising: forming a compound material comprising a mixture of curable matrix-forming binder, heat resistant reinforcing fibers, and at least one particulate material, wherein the curable matrix-forming binder is 5 to 50% by volume of the compound material; curing the curable binder under simultaneous application of externally applied pressure and ultrasonic energy. Articles according to the invention are useful in a multitude of applications, particularly in applications where the article must retain its shape and properties when subjected to temperatures above the melting point of usual thermoplastic materials, e.g. above 1000° C. The method provides dense, thermally stable, coherent composite materials having a desired high density. Forming and curing times are typically 10 times shorter than conventional methods, e.g. for brake pads in about 3–5 seconds.

42 Claims, 2 Drawing Sheets

FIG. 1

FIG. 2

METHOD AND APPARATUS FOR MANUFACTURING AN ARTICLE OF A COMPOSITE MATERIAL

1. BACKGROUND OF THE INVENTION

1. Field of the Invention

This invention relates to a method of fabricating an article made of a composite material by providing a compound material, producing a green body by forming and compacting the compound material into a desired compact form, producing the article by curing a curable matrix-forming binder in said green body, and, optionally, post-curing the matrix; and further relates to apparatus for use in carrying out the method, and articles of manufacture fabricated by the method.

Articles of manufacture of composite materials according to the present invention are useful in a multitude of applications particularly where in use the article must retain its shape and properties when subjected to temperatures above the melting point of usual thermoplastic materials, e.g. above 1000° C. Typical examples of articles include friction pads, commutators, rubber parts, heat shields, electrical insulations, connectors, machinery parts, and magnets and bearings.

2. Prior Art Disclosure

GB Patent Application No. 2 012 204 discloses a composite friction assembly comprising at least one friction member and a support member, said friction member being formed from a mixture of a thermosettable phenol-aldehyde resin and filler material by heating a mould to a temperature of the resin, usually between about 160° C. and about 180° C., and exerting on the mixture a pressure, normally between about 2068 bars (approximately 30,000 psi) and about 3447 bars (approximately 50,000 psi) in a time between about 2 second and 10 second.

EP Patent Application No. 0 352 363 discloses an acrylic containing friction element manufactured by compressing a mixture comprising a thermosetting organic binder, a fibrous reinforcing material, and an effective amount of fibrillated acrylic polymer fibers to form a preform; pressing the preform at elevated temperatures; treating the pressed material at a temperature sufficient to effect curing and then forming a friction element such as disc brakes, friction pads, clutch linings from the cured material. The pressure to form the preform is in the range from 140 to 350 bars (approximately 2000 to 5000 psi), and the curing of the preform is accomplished by heating to a temperature in the range from 350° to 600° F. (175°–315° C.) for about 15 min., whereafter the preform is post-baked for several hours.

A disadvantage of these processes is that the compaction of the compound material has to be carried out at pressures as high as 200–500 bars, or more, for a satisfactory flow and compaction of the moulding material to occur which requires costly tooling and press equipment.

Further, for economically short forming and curing times, the cure of the curable matrix binder has to proceed at an elevated curing temperature typically in the range from about 135° C. to about 250° C., or more, to ensure that the curing temperature has been reached in all parts of the article. Otherwise, if lower curing temperatures are applied, long forming and curing times are required which limits the production rate.

The curing time depend on the nature of the curable matrix binder and the dimensions of the article. For large articles, such as friction elements for brake pads, the curing time can be from about 15 min. to about 75 min., or more before sufficient mechanical stability Is obtained, and the article can be removed from the mould and transferred to an oven for post-cure.

Another disadvantage of these processes is that the heating is provided by conductive transfer of heat from the mould into the compound material the homogeneity of which heat transfer is difficult to control and results in a non-uniform polymerisation of the curable matrix-forming binder.

This deficiency of conductive heat transfer into moulds has been recognized, and methods of providing a homogeneous and accelerated transfer of energy-into the compound material have been disclosed.

EP Patent Application No. 0 347 299 discloses the use of capacitative microwave heating at pressures from 50 to 200 bars in moulding glass-filled unsaturated polyester resin bonded composites; and German Laid Open Patent Application No. 29 06 842 discloses the use of capacitative high frequency microwave heating with a frequency of 2450 MHZ for moulding of thermosetting materials. Both these methods are not suitable for composite materials containing significant amounts of metals. Further, they involve electrical shielding which is impractical to handle, and the apparatus is complicated.

EP Patent Application No. 0 093 655 discloses a method of fabricating an organo-metallic composite material comprising a mixture of a thermosetting resin, a metallic powder, and additives intended to confer certain properties to the final product by simultaneously application of induction heating and pressure, said pressure ensuring a good electrical conductivity of the composite material.

This method requires a high content of electric conducting material having an appreciable hysteresis loss.

GB Patent Applications Nos. 2 106 823 and 2 135 412 disclose a method of resistive heating and sintering of metallic friction materials including a method of producing a friction assembly of friction material to a support member using resistive heating. This method requires a sufficiently high proportion of electrically conducting material.

Besides the disadvantages mentioned these processes have a high probability of providing articles having void formations and non-uniform distribution of material components, particularly when the compound material comprises particulate materials of different sizes and densities and/or comprises one-or more constituents in very low concentrations.

Alternative methods of heating by application of ultra sonic energy have been disclosed.

U.S. Pat. No. 4,487,728 discloses a method of producing mouldings of specific thermoplastic materials in a multi cavity mould using ultrasonic vibration. Sintered blanks are obtained which are capable of further thermo-forming to the required shape.

U.S. Pat. No. 4,548,771 discloses a method of vulcanizing conventional rubber materials comprising 75% by volume of base elastomer, thus exclusively elastomeric In nature, and less than 25% by volume of filler material by initially applying ultrasonic energy at a maximum intensity of 31 W/cm$^2$ and asymptotically reducing the intensity to 40–45% of its initial value in the course of 3–5 min. there by avoiding degradation of the elastomer due to exposure to excessive heat. Nothing is disclosed or suggested about curing composite materials containing a curable matrix forming binder in less than 5 to 50% by volume.

Methods of producing friction products by a two-step procedure comprising preheating of frictional material by applying ultrasonic vibrations onto the material; and then applying pressure to the preheated material have been disclosed.

WPI Acc. No. 83-26393K/11 publishes an abstract of Japanese Patent Application No. 58 020 413 (Australian Patent Application No. 86289-82) disclosing a method of moulding a friction material comprising providing a back metal on a support bed; filling particles of a friction material in the moulding cavity formed between a die and the support bed; melting the particles by heating using ultrasonic vibration; then transferring the die and support bed, the particles and the back metal to a pressing process wherein the particles-are moulded so that the moulded friction material is welded to the back metal.

An ultrasonic wave forming method comprising simultaneous application of ultrasonic wave oscillation and forming under pressure to the friction material is mentioned. However, this application teaches away from a method of frabricating an article of manufacture by a one-step process applying ultrasonic heating and pressure simultaneously, because increasing pressure allegedly results in a retardation of the speed of the ultrasonic wave oscillations.

WPI Acc. No. 84-265815/43 publishes an abstract of Japanese Patent Application No. 59 023 804 disclosing a method of producing a friction product for brakes comprising preheating a frictional powder containing inorganic, organic and/or metallic fibres, friction adjuster, filter, and organic coupler, and hot press-forming the powder.

WPI Acc. No. 85-046916/08 publishes an abstract of Japanese Patent Application No. 60 004 536 disclosing a method of moulding a frictional member comprising placing a back metal treated with an adhesive on the bottom of a mould; charging a powdered frictional material onto the back metal; preheating the frictional material by applying ultrasonic vibrations onto the powdered frictional material; and applying a high pressure to the frictional material either by means of the vibration horn of the ultrasonic vibrator, or a hot press, thereby obtaining that moisture and gasses are removed from the frictional material during preheating; venting is not required in the subsequent stage of moulding under application of high pressure to the frictional material; and moulding can be done in a short time period.

Patent Abstract of Japan Vol. 11, No. 1 (M-550) publishes an abstract of Japanese Patent Application No. 61 181 630 disclosing the use of ultrasonic energy in friction heating of sinterable powders. Materials are vibrated until their melting point is reached at which stage they sinter together at the points of contact. The method is aimed specifically at the manufacture of porous materials which do not contain a polymeric binder.

2. DISCLOSURE OF THE INVENTION

Method of Fabrication

It is the object of the present invention to provide a method of fabricating a dense, and coherent article of manufacture of a composite material of desired high density.

Further, it is the object of the present invention to provide such a method wherein the article of manufacture has a reduced porosity and formation of voids.

Also, it is the object of the present invention to provide such a method wherein the curable matrix-forming binder may be uniformly cured in a short time.

It has previously been assumed that ultrasonic energy can not be used to cure powdery materials containing a heat curable matrix-forming binder under pressure in an integrated heating and curing process because the ultrasonic energy cannot dissipate sufficiently in the powdery material to initiate and maintain the heat curing process.

However, it has surprisingly been found that an excellent integrated compacting, heating and curing process can be obtained by proper selection of pressure and amplitude of the ultrasonic vibration.

By the above defined selection of the ultrasonic radiation proper dissipation of ultrasonic energy is ensured. The transferred ultrasonic energy is primarily transferred to particulate material particle oscillation energy, which subsequently is transformed to uniformly distributed heat.

The desired high density is thus easily obtained by a compacting mechanism provided by the combined action of suitably adjusted external pressure and controlled inter particle movements.

The desired uniformity of the cured matrix material is ensured by the uniform dissipation of the ultrasonic energy to heat, whereby a desired rapid increase in temperature can also be obtained.

"Pressure and Ultrasonic Energy Dissipation"

The pressure used in the method may vary within wide limits. Pressures from 10 to 200 bars are normally suitable. Higher pressures can be used, if necessary. Preferably pressures from 60 to 120 bars, most preferably from 70 to 100 bars, are used if the ultrasonic energy is applied at a constant pressure.

Otherwise, by applying a pressure profile and a constant amplitude of the ultrasonic oscillations, the pressure is in the range from 5 to 60 bars, preferably from 10 to 40 bars.

The ultrasonic energy may vary within wide limits. Generally a frequency above 18 kHz, preferably from 18 to 40 kHz, most preferably about 20 kHz is used.

Particularly critical is the amplitude of the ultrasonic oscillation which should be suitably small depending on the pressure applied. Thus, besides providing a compacting pressure for compacting the powdery material, the applied pressure shall provide sufficient coupling between the ultrasonic transducer and the material. Thus, a high pressure increases the probability for attenuating the oscillations. Therefore, it turns out to be necessary to reduce the amplitude of the ultrasound oscillations rather than to increase the amplitude. This reduction can be obtained by use of an inverted sonic amplitude booster.

In an alternative method of fabrication, simultaneous application of pressure and ultrasonic energy can be applied at a constant amplitude of the ultrasonic oscillations by applying pressure profile comprising applying an initial pressure of 10 bars and allowing the ultrasonic energy to dissipate for 2 to 5 seconds; allowing the pressure to rise at an even rate to 30 bars in the course of 3 to 5 seconds and ultrasound energy dissipation continued; discontinuing the ultrasonic energy transfer; and imposing a dwell period of 20 to 30 seconds wherein the pressure is maintained at 30 bars while the mould is cooled. It is thus obtained that the method can be carried out at a much lower pressure.

Compared to prior art techniques, the present invention provides articles of manufacture having a more uniform consistency, controlled porosity, and fewer voids. Another advantage of the process is the reduced curing time, forming and curing times often being more than 10 times shorter than conventional processes. Thus, typical forming times of brake pads according to the invention are 3–5 seconds.

Further, according to the invention, the method can be used to manufacture a composite article comprising at least one support element.

In another preferred embodiment, the particulate material is comprising a reinforcing material, an electric conductive material, or both.

Also, if even higher production rates are required, the article can be partly cured in the apparatus and transferred to post-curing by a conventional heating.

"Curable Matrix-Forming Binder"

According to the invention any curable binder producing cross linked or three dimensional structures may be used as the matrix-forming binder.

The matrix-forming binder include condensation-type thermosetting polymers including condensation polymers of formaldehyde combined with phenol, urea, melanin, or resorcinol; diallyl phthalate, and diallyl isophthalate;

polyester resins including addition-type unsaturated polyester and condensation resins obtained from the reaction of polyols and multifunctional carboxylic acids such as adipic or terephtalic acids;

vinyl esters;

epoxy polymers including diglycidyl ether of bisphenol A, epoxy-novolak resins obtained from the reaction of epichlorohydrin and a phenolic-novolak resin cured conventionally by addition of amines or anhydrides;

polyamide-imide polymers;

polyimide polymers;

polyurethanes including the polymerisation products of polyols and di-iso cyanates such as trimethylol propane and toluene diisocyanate; and heat resistant silicone polymers including phenyl-methyl or methyl hydroxy-functional silanol products which are brought to react with phenolic resins, epoxy resins, polyester resins or other resinous materials containing hydroxyl groups.

"Particulate Material"

According to the invention any particulate material may be used including mineral particles, e.g. calcium carbonate, metal oxides, baryte, silica, clay, glass spheres, graphite, carbon black, or coke powder;

reinforcement materials such as heat resistant man-made fibers including mineral fibers, aromatic polyamide fibers, novolak fibers, glass fibers, rock wool, carbon fibers, sponge iron, dendritic copper, and crushed magnetic neodynium boron iron;

heat resistant minerals with elongated crystal form and an aspect ratio greater than 3 including wollastonite, attapulgite, and sepiolite; and heat resistant crystals with a micaceous form including muscovite, phlogopite, lepidolite, biotite, and micaceous haematite.

Also, organic particles or fibers may be used, e.g. saw dust and textile fibres, and particularly graphitized carbon fibers, conductive fillers, including conductive carbon black, conductive polymers, including polyethylene oxide, or electronically conductive polymers, including polyacetylene.

"Other Additives"

According to the invention additives may be added such as antioxidants, antistatics, colorants, coupling agents, flame retardants, foaming agents, heat stabilizers, impact modifiers, lubricants, curing agents (initiators, accelerators, and catalysts), plasticizers, preservatives, and processing aids (mould release agents, antiblocking agents, viscosity depressants), etc.

Apparatus of Production

A further object of the present Invention is to provide an apparatus of production to be used in carrying out the method of fabricating an article of manufacture of a composite material according to the invention having at a high rate of production, a uniform quality and a low cost compared to conventional production apparatus.

Article of Manufacture

A still further object of the present invention is to provide an article of manufacture comprising a dense, thermally stable, and coherent composite material of desired high density.

Examples of such articles are disc-brake pads, hard magnet elements, soft iron articles, woven glass fiber pads, heat resistant electrical insulating articles, etc.

Definition of Expressions

Within the present context the expression a "particulate material" is intended to designate a material in a fluid form of powder, preferably a dry powder. A powdery material may comprise materials in form of powder, fibers (reinforcements), laminars, particulates (fillers), etc. These materials may include reinforced composite materials.

Within the present context, the expression "compound material" designates an admixture of a curable matrix-forming binder with at least one particulate material and optionally other additives including fillers, softeners, plasticizers,,reinforcements, catalysts, pigments, or dyes.

Within the present context, the expression "composite material" designates a combination of two or more distinct materials comprising a particulate material and a matrix which materials differ in form or composition on a macroscale. The constituents of the composite material retain their identities, i.e. they do not dissolve or merge completely into one another, although they act in concert. Normally, the components can be identified and exhibit an interface between one another.

Within the present context, the expression "matrix" designates an essentially homogeneous coherent phase in a composite material in which the particulate materials of the composite is embedded. Within the present context, the expression "a curable matrix-forming binder" is a precursor for the matrix which is transformed to an essentially homogeneous coherent phase of cured binder in the composite material during the fabrication of said composite material.

Within the present context, the expression "cure" designates the irreversible change of the properties of a binder by chemical reaction whereby the binder is consolidated.

4. DETAILED DESCRIPTION

Apparatus of Production

Figure 1:
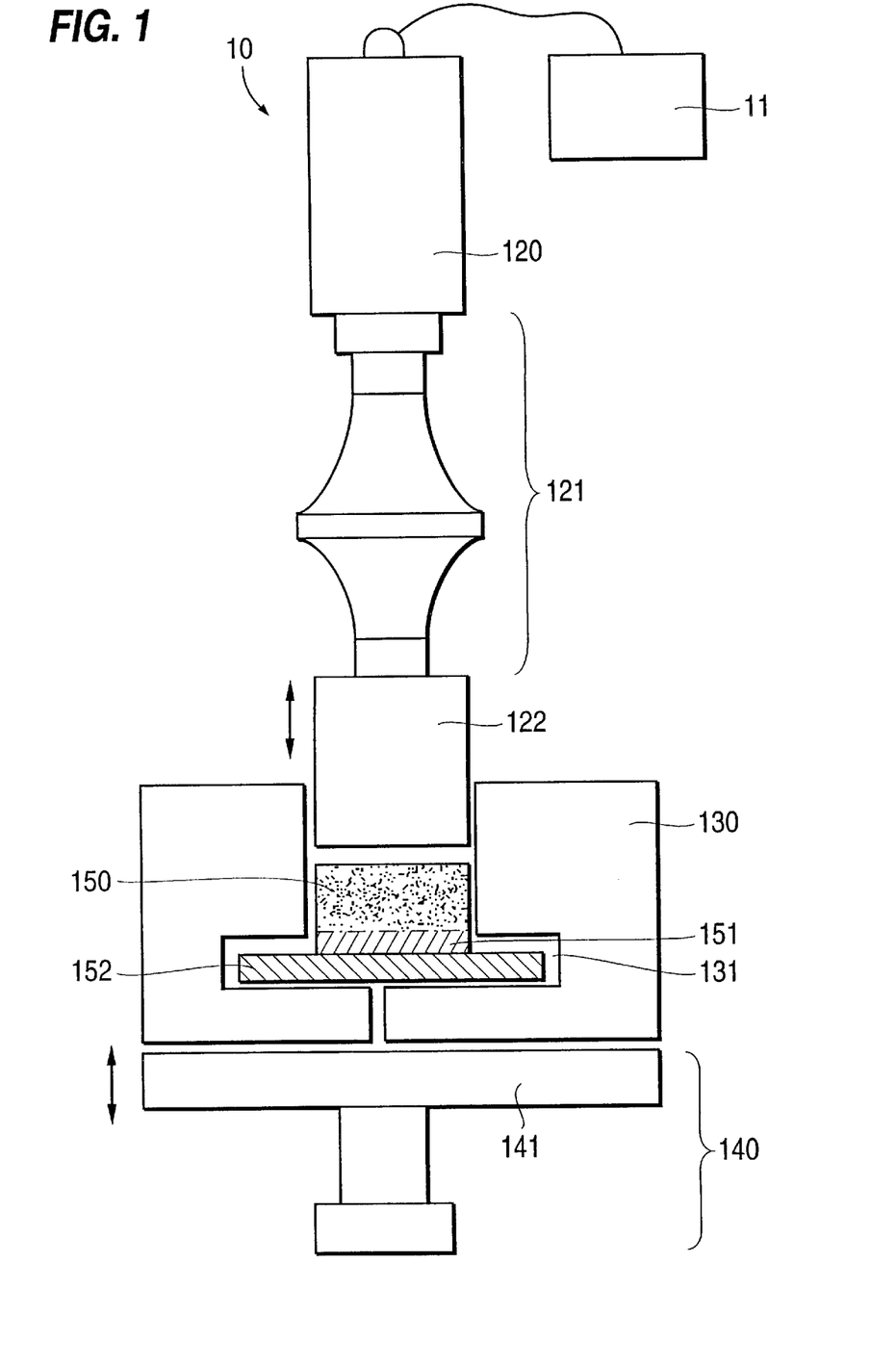
FIG. 1 shows a sectional sketch of a disc brake pad manufactured by the method according to the invention.

Referring to FIG. 1, an ultrasonic compacting and curing apparatus 10 comprises an electric oscillator 11 generating electric oscillations in the range 18 to 200 kHz; an ultrasound generating unit 120 comprising a piezo-electric crystal converting electrical oscillations to mechanical oscillations, an inverted sonic amplitude booster 121 amplifying/attenuating the amplitude of the mechanical oscillation and generating a desired oscillation pattern, i.e. a distribution of maxima, minima, and nodal points of the oscillations, and a sonotrode or horn 122 designed and shaped to transfer maximum ultrasound energy to a disc brake pad 150,151,152 being moulded and cured; a mould or die 130 having movable parts and enclosing a die cavity 131; and a pressure generating device 140 applying a static predetermined pressure on the die 130 and subsequently the backing plate 152 of the disc brake pad being moulded and cured.

A specific apparatus comprises an electric oscillator 1300 P supplied by Branson Sonic Power A/S, Kastrup, Denmark. "Booster and Sonotrode"

Generally, the ultrasound energy transfer from the sonotrode 122 to the compound material depends on the amplitude and frequency of the ultrasound oscillations and on the pressure by which the energy is transferred to the material.

However, in order to be able to apply sufficient energy at the beginning of the moulding operations without completely attenuating the oscillations, the combination of amplitude of the ultrasound oscillation and the applied pressure-must be optimized. Thus, it is advisable to reduce the amplitude of the oscillations by inverting the booster when a high moulding pressure is applied.

Alternatively, especially for materials with a well-established plastic flow when heated to the plastic stage, it can be necessary to reduce the pressure in order to maintain ultrasound energy dissipation at, the required level.

Thus, in designing a proper ultrasonic compacting and curing apparatus for the manufacturing of a given article, the sonotrode 122 is shaped according to the article and further designed to transfer maximum ultrasound energy of the desired frequency and amplitude depending on the material to be moulded and cured and depending on the pressure applied. Then the booster 121 is designed to meet the requirements of the sonotrode 122 and a given conventional ultrasound converter 120.

Further, in optimizing the ultrasound energy transfer to the material, particularly composite materials comprising a plurality of components, the frequency, amplitude and pressure can be varied during the manufacturing process.

5. EXAMPLES

Example 1

Preparation of a Non-Asbestos Disc Brake Pad

A non-asbestos disc brake pad, e.g. 150,151,152 as illustrated in FIG. 1, has been prepared according to the invention by co-compacting a non-asbestos friction material 150 of formulation (A) (see below) with an adhesive-promoting underlayer 151 of the composition (B) and compacting said material and layer to a steel backing plate (152) followed by curing the combined friction material, underlayer and backing plate by simultaneously applying a constant pressure of 150 bars and ultrasonic energy dissipation of 165 kW/kg (3.3 kW per 20 g compound material) using an inverted Black 1:2.5 Booster supplied from Branson Sonics Power A/S, Kastrup, Denmark.

A. Friction material formulation of the following composition by volume:

| | |
|---|---|
| Artificial mineral fibres: | 16.2% |
| Novolak phenolic matrix-forming binder: | 14.8% |
| Powdered nitrile elastomer: | 8.2% |
| Barytes: | 10.5% |
| Granulated electrode graphite: | 5.5% |
| Hematite: | 6.0% |
| Muscovite mica: | 16.0% |
| 30 Calcium silicate: | 10.0% |
| Petroleum coke: | 6.0% |
| Lead sulphide: | 6.8% |

B. Adhesion-promoting underlayer of the following composition by volume:

| | |
|---|---|
| Novolak phenolic matrix-forming binder: | 25% |
| Powdered nitrile rubber: | 12% |
| Rockwool lapinus 4164 fibre: | 63% |

30 g of the formulation A and 10 g of the underlayer B were transferred to a 16 $CM_2$ die cavity of an ultrasonic compacting and curing apparatus as shown in FIG. 1.

A steel backing plate 152 was inserted between the underlayer B of the compacted layered structure of friction material A and adhesion-promoting underlayer B into the die cavity 131 by removing the platten 141 of the pressure generating device 140 a few millimeters.

Pressure was then applied to the back plate 152. On reaching a pressure of 138 bars, ultrasound of 20 kHz was applied at a power of 3300 Watts for a period of 6 seconds and then switched off. The pressure was held for a further 6 seconds and then released. The finished disc pad was ejected from the mould by removing the die platten 141;

The disc pad was then post-cured by conventional heat treatment in an air oven for 10 hours at 160° C.

In an alternative method of fabrication, simultaneous application of ultrasound energy and pressure was applied by an initial pressure being 10 bars and the ultrasound being dissipated for 2 to 3 seconds whereafter the pressure is allowed to rise at an even rate to 30 bars in the course of 3 to 4 seconds and ultrasound energy dissipation continued. Hereafter the ultrasound energy transfer is discontinued and a dwell period of 24 seconds is imposed wherein the pressure is maintained at 30 bars while the mould is cooled.
Comparison of Disc Pads The prepared disc pads were compared to disc pads prepared from the same disc brake formulation (A), adhesion-promoting underlayer (B), and steel backing plate, but cured using conventional heating.

Figure 2:
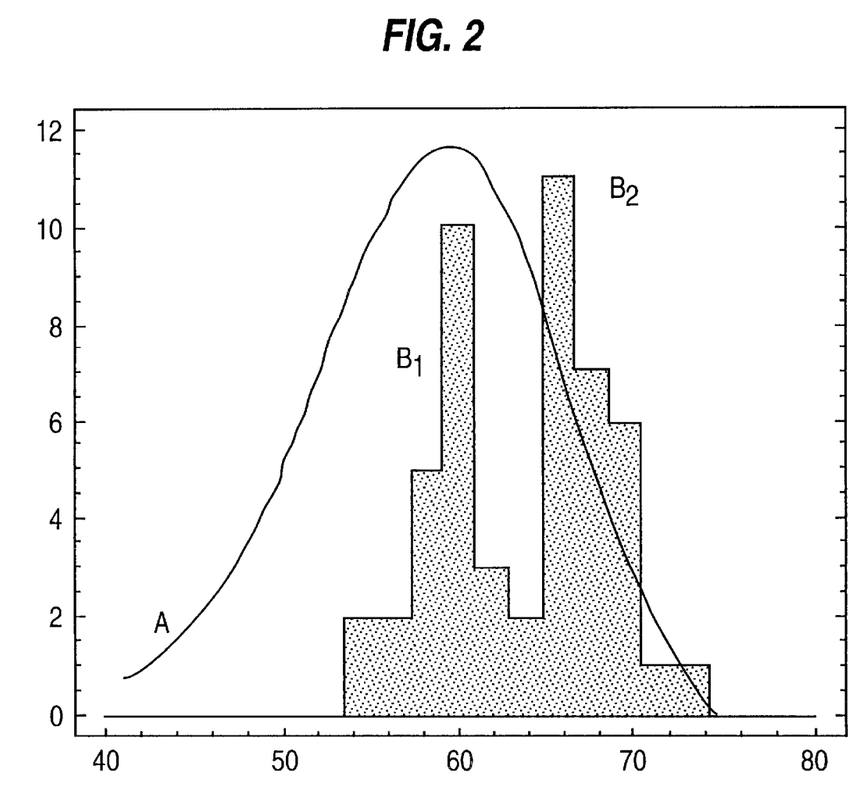
FIG. 2 shows a distribution of shear strengths of disc brake pads fabricated according to the invention and compared to conventionally produced disc brake pads.

In one batch B2, 17 disc brake pads were manufactured according to the invention were subjected to a shear strength, all falling at a shear strength above 50 $kg/cm^2$ as shown in FIG. 2.

The 17 disc brake pads had an average shear strength of about 67 $kg/cm^2$ with a range from 60 to 74 $kg/cm^2$ compared to the minimum acceptable shear strength of 50 $kg/cm^2$.

100 conventionally heat-cured disc brake pads had all an average shear strength of about 60 $kg/cm^2$ and a significantly larger range from 40 to 80 $kg/cm^2$.

In another batch B1, 57 disc brake pads manufactured according to the invention were subjected to a shear test, all failing at a shear strength above 50 $kg/cm^2$ as shown in FIG. 2.

57 disc brake pads had an average shear strength of about 60 $kg/cm^2$ with a range from 52 to 74 compared to the minimum acceptable shear strength of 50 $kg/cm^2$.

Besides shorter manufacturing times of few seconds compared to minutes for conventional heat curing, the shear strength tests show that pressure and ultrasound-induced curing according to the invention provides a much stronger article, and a significantly improved homogeneous quality of production.
Friction Tests Disc pads manufactured according to the invention were tested on a Friction Test Machine from Allied Signal GmbH, Reinbed, Germany capable of performing tests a constant rubbing speed according to the procedures adopted as an industrial standard in Europe.

The test was carried out at 660 rpm at a constant torque of 120 Nm on a disc pad used in a frontwheel application on a 75° cc motorcycle.

Friction test results for normal pads (Test no. 8) and for pads prepared according to the invention (Test no. 188) are shown in Table 1.

TABLE 1

Friction Test Results

| Test No. Material | 8 Standard | 188 Ultrasound |
|---|---|---|
| Av $\mu$ | 0.405 | 0.441 |
| Min $\mu$ | 0.2 | 0.23 |
| Max $\mu$ | 0.51 | 0.55 |
| Cold $\mu$ | 0.4 | 0.44 |
| Fade $\mu$ | 0.2 | 0.23 |
| Wear Pad 1 | 0.9 | 1 |
| Wear Pad 2 | 1 | 1 |

The results shows that the friction coefficient has been raised slightly, due to an improvement in frictional stability in single brake applications, while the wear rate has not been changed. There is a marginal improvement in fading performance.

Example 2
Hard Magnet Elements

Magnets were made of Neodynium boron magnetic material, suspended in a Novolak phenolic matrix-forming binder using the following procedure. 100 g of crushed metal alloy material was intimately mixed with 10 g Novolak, and the mixture was placed in a cylindrical die cavity and subjected to a pressure of 200 bars and simultaneously ultrasound energy of 20 kHz and density 500 kHz per kilo gram weight of compound material.

Example 3
Soft Magnetic Core Article 100 g carbonyl iron of a particle size of 6–8 $\mu$m was intimately mixed with 50 g of a 30% alcoholic solution of a bisphenyl epoxide. 2 g phthalic anhydride was added, and the mixture was dried to a powder. The mixture was cured in a mould shaping the material to the required form while the polymeric binder crosslinked sufficiently to maintain shape during the subsequent post-cure. This was carried out by subjecting the material to a pressure of 200 bars while simultaneously being subjected to ultrasound of 20 kHz for a total energy dose of 100 kHz per kilogram weight of compound material.

The compressed article was post cured at 150° C. for 20 minutes.

The cylindrical article was a magnet having a very low hysteresis loss.

Example 4
Pads of Woven Glass Fibers

A pad of woven glass fibers was saturated with a liquid polyester polymer binder containing 10% (w/w) calcium carbonate powder, 1% benzoylperoxide and 1% cobalt naphthanate. The pad was cured for 5 seconds under a pressure of 120 bars and ultrasound of 20 kHz and a total energy dose of 50 kJ per kilogram weight of compound material.

Example 5
Heat Resistant Electrical Insulating Article

A dough of 70% amorphous silica based composite material and 30% silicone polymer binder was-transferred to a mould for an insulating cup and subjected to a pressure of 200 bars and ultrasound of 20 kHz and a total energy dose of 1000 kJ per kilogram weight of compound material.

Example 6
Commutator

An electric motor commutator having an outer diameter of 20 mm, height 24 mm and internal bore of 10 mm was prepared from 13 g of a mixture containing 30 t by weight of phenolic resin as binder and 70% by weight filler consisting of glassfibers and silica.

The mixture was transferred to a 20 mm inner diameter mould and placed as a powder inside a commutator coppering. The commutator was pressed at 160 bars and simultaneously exposed to ultrasound at a frequency of 20 kHz 5 in 7 seconds. The commutator was left for cooling for 25 seconds in the mould. Then post-cured at 180° C. for 8 hours.

The commutators manufactured showed no internal porosity and step arbor tests of the material showed an expansion at break of 60 micrometers and an ultimate strength of 210 to 400 kg with an average of 301 kg.

The compression strength was found to be significantly improved compared to conventionally processed commutators. In the axial direction the longitudinal breaking force for three commutator tubes was 7500 for all three. in the radial direction the compression force at failure was 454, 504 and 468 kg.

It is anticipated that the significantly improved physical properties is due to an improvement of the preferential orientation of the reinforcing fibers of the composite material when compacted using ultrasonic energy.

The conventional process involves compression of preformed or granulated material which flows into the annulus of the die. During this flow process the reinforcing fibre tend to orientate longitudinally and parallel to the axis. This reduces the burst and compression strength of the article. When these articles are compacted using ultrasound the enhanced material flow in the loosely filled powdered material yields a compacted article where, there is much less preferential orientation in the axial direction. As more fibre is orientated tangentially or circumferentially the step arbour test results are much more uniform at an improved level. Compression tests in the longitudinal and radial direction are improved and show a smaller distribution.

Example 7
Commutator Brush

An electrical contacting brush for use in electrical motors, having a length of 25 and a square cross sectional area of 1 $cm_2$ was manufactured from a compound material composed by volume as follows:

| | |
|---|---|
| Granulated Electrode Graphite 0–0.5 mm: | 30% |
| Powdered Graphite Lonza KS6: | 15% |
| Conductive Black Ketjen EC: | 7% |
| Bronze Powder 90/10: | 3% |
| Phenolic Resin J1311H: | 32% |
| Sigrafil Carbon Fibre SF01MNT: | 4% |
| Kynol Novolak Fibre KF0203: | 3% |
| Kynol Novolak Fibre KF05BT: | 3% |
| Powdered Cuprous Sulfide: | 3% |

The material was filled into a mould die with a sectional length of 25 mm and a sectional height of 10 mm so that the final dimensions were 25×10×10 mm. The plunger was dropped and pressure applied at 100 bars. Ultrasonic energy was applied for 2.3 seconds and the pressure was maintained for a further 3 seconds before the brush was ejected from the mould.

The finished item had an electrical resistivity of 0.128 Ohm cm.

We claim:

1. A method for preparing a composite material with fiber reinforcement which comprises forming a compound material comprising a mixture of a curable matrix forming binder, heat resistant reinforcing fibers, and at least one particulate material, wherein the amount of said curable matrix-forming binder is in the range of from 5 to 50% by volume of the compound material, curing said binder in said mixture by compacting and heating said mixture by simultaneously subjecting said mixture to an externally applied pressure and ultrasonic energy applied by sonic oscillations at a given frequency, wherein said external pressure is in the range of from 60 to 200 bars and greater than an internal pressure of said mixture of compound material undergoing compaction and heating, wherein the amplitude of said sonic oscillations applied to said mixture is reduced sufficient to overcome the internal frictional forces between said reinforcing fibers and said at least one particulate material of said mixture undergoing compaction and heating without completely attenuating the sonic oscillations, and wherein an amount of said ultrasonic energy is dissipated into heat sufficient to ensure formation of a coherent, cured matrix binder in said compound material, and then recovering the resulting composite material.

2. A method according to claim 1 wherein the ultrasonic energy density per weight of compound material under pressure is within the range from 33 to 16500 kJ/kg.

3. A method according to claim 2, wherein the ultrasonic energy density per weight of compound material treated under pressure is within the range from 50 to 5000 kJ/kg.

4. A method according to claim 3, wherein the ultrasonic energy density is within the range from 100 to 800 kJ/kg.

5. A method according to claim 1, wherein the ultrasonic energy has a dissipation rate within the range from 33 to 660 kW/kg of compound material treated.

6. A method according to claim 5, wherein the ultrasonic energy dissipation rate is within the range from 50 to 400 kW/kg of compound material treated.

7. A method according to claim 6, wherein the ultrasonic energy dissipation rate is within the range from 66 to 165 kW/kg of compound material treated.

8. A method according to claim 1, wherein the ultrasonic energy has a frequency above 18 kHz.

9. A method according to claim 8, wherein the ultrasonic energy has a frequency from 18 to 40 kHz.

10. A method according to claim 9, wherein the ultrasonic energy has a frequency of about 20 kHz.

11. A method according to claim 1, wherein the composite material is post-cured by thermal heating.

12. A method according to claim 1, wherein the composite material further comprises at least one support element onto which the compound material is compacted and heated.

13. A method according to claim 1, wherein the reinforcing fibers are selected from the group consisting of heat resistant man-made fibers, and heat resistant minerals with an elongated crystal form and an aspect ratio greater than 3.

14. A method according to claim 13, wherein said at least one particulate material is selected from the group consisting of calcium carbonate, metal oxides, baryte, silica, clay, glass spheres, graphite, carbon black, coke powder, and lead sulfide.

15. A method according to claim 13, wherein said heat resistant man-made fibers are selected from the group consisting of mineral fibers, aromatic polyamide fibers, novolak fibers, glass fibers, rock wool, carbon fibers, and dendritic copper.

16. A method according to claim 13, wherein said reinforcing fiber save heat resistant minerals having an elongated crystal form and an aspect ratio greater than 3 and is selected from the group consisting of wollastonite, attapulgite, sepiolite, muscovite, phlogopite, lepidolite, biotite, and haematite.

17. A method according to claim 1, wherein said at least one particulate material is an electrically conductive material selected from the group consisting of graphitized carbon fibers, electrically conductive fillers, ionically conductive polymers and electronically conductive polymers.

18. A method according to claim 17, wherein said electrically conductive fillers are conductive carbon black.

19. A method according to claim 17, wherein said ionically conductive polymers are polyethylene oxide.

20. A method according to claim 17, wherein said electronically conductive polymers are is polyacetylene.

21. A method according to claim 1, wherein the curable matrix-forming binder is selected from the group consisting of thermosetting polymers, polyester resins, vinyl esters, epoxy polymers, polyamide-imide polymers, polyimide polymers, polyurethanes, and heat resistant silicone polymers.

22. A method according to claim 21, wherein said curable matrix-forming binder is a thermosetting polymer cured by a condensation reaction and selected from the group consisting of condensation polymers of formaldehyde combined with phenol, urea, melanin, or resorcinol; thermosetting diallyl phthalate, and thermosetting diallyl isophthalate.

23. A method according to claim 21, wherein said curable matrix-forming binder is a polyester resin selected from the group consisting of unsaturated polyester cured by an addition reaction and condensation resins obtained from the reaction of polyols and multifunctional carboxylic acids.

24. A method according to claim 23, wherein said carboxylic acid is adipic or terephthalic acid.

25. A method according to claim 21, wherein said curable matrix-forming binder is an epoxy polymer selected from the group consisting of a diglycidyl ether of bisphenol A, and epoxy-novolak resins obtained from the reaction of epichlorohydrin and a phenolic-novolak resin, both cured conventionally by the addition of an amine or an anhydride.

26. A method according to claim 21, wherein said curable matrix-forming binder is a polyurethane obtained from the polymerization reaction of a polyol and a diisocyanate.

27. A method according to claim 26, wherein said polyol is trimethylol propane.

28. A method according to claim 27, wherein said diisocyanate is toluene diisocyanate.

29. A method according to claim 21, wherein said curable matrix-forming binder is a heat resistant silicone polymer obtained by reacting a phenyl-methyl or methyl hydroxy-functional silanol product which is reacted with a phenolic resin, an epoxy resin, a polyester resin or another resinous material containing hydroxyl groups.

30. A method according to claim 1, wherein the amount of the curable matrix-forming binder is within the range of 15 to 45% by volume of the compound material.

31. A method according to claim 30, wherein the amount of the binder is within the range of 20 to 35% by volume.

32. A method according to claim 1, wherein the externally applied pressure is within the range from 60 to 120 bars.

33. A method according to claim 32, wherein the externally applied pressure is within the range of 70 to 100 bars.

34. A method according to claim 1, wherein said compound material contains at least one additive.

35. A method according to claim 34, wherein said additive includes at least one member selected from the group consisting of antioxidants, antistatics, colorants, coupling agents, flame retardants, foaming agents, heat stabilizers, impact modifiers, lubricants, curing agents, plasticizers, preservatives and processing aids.

36. A method as claimed in claim 35, wherein the curing agent is selected from the group consisting of an initiator, an accelerator, and a catalyst.

37. A method as claimed in claim 35, wherein said processing aid is selected from the group consisting of a mold release agent, an antiblocking agent and a viscosity depressant agent.

38. A method as claimed in claim 1, wherein the composite material containing said cured matrix binder is subjected for a period of time to externally applied pressure after discontinuing the application of said ultrasonic energy to the composite material.

39. A method as claimed in claim 1, wherein the compound material subjected to curing is a preform formed by forming and compacting the mixture into a desired compact form.

40. A composite material produced by the method of claim 1.

41. The composite material according to claim 40 formed into an article selected from the group consisting of a brake pad, an electrically conducting article, and a commutator brush comprising an electrically conducting material.

42. An apparatus for the manufacture of an article to be formed of a composite material according to the method of claim 1 comprising in combination:

a) an electric oscillator for generating electric oscillations;

b) an ultrasound generating device for converting the electric oscillations to mechanical oscillations;

c) a sonically tuned energy transfer system comprising a sonic amplitude booster for amplifying/attenuating the amplitude of the mechanical oscillations and a sonotrode for transferring ultrasound energy to the composite material;

d) a closed mold cavity for containing the composite material; and e) a pressure generating device for applying pressure on composite material contained in the cavity, wherein the sonic amplitude booster is an inverted sonic amplitude booster which reduces the amplitude of oscillations transferred from the sonotrode.

* * * * *

UNITED STATES PATENT AND TRADEMARK OFFICE
CERTIFICATE OF CORRECTION

PATENT NO. : 5,888,645
DATED : March 30, 1999
INVENTOR(S) : Torben LINDGAARD et al.

It is certified that error appears in the above-identified patent and that said Letters Patent is hereby corrected as shown below:

Claim 1, Col. 11, line 4, "matrix forming" should read --matrix-forming--.

Claim 16, Col. 12, line 2, "fiber save" should read --fibers are--.

Claim 20, Col. 12, line 16, after "are", delete "is".

Claim 25, Col. 12, line 44, "a diglycidyl: should read --(a) diglycidyl--.

Claim 25, Col. 12, line 45, "and epoxy-novolak" should read --(b) epoxy-novolak--.

Claim 38, Col. 13, line 19, after "binder is", insert --further--.

Signed and Sealed this

Second Day of November, 1999

Attest:

Attesting Officer

Q. TODD DICKINSON

Acting Commissioner of Patents and Trademarks